(12) United States Patent
Stanley (10) Patent No.: US 10,612,699 B2
(45) Date of Patent: Apr. 7, 2020

(54) COATED FLANGED COUPLING

(71) Applicant: Gary Paul Stanley, Preston (AU)

(72) Inventor: Gary Paul Stanley, Preston (AU)

( * ) Notice: Subject to any disclaimer, the term of this patent is extended or adjusted under 35 U.S.C. 154(b) by 793 days.

(21) Appl. No.: 14/358,529

(22) PCT Filed: Nov. 21, 2012

(86) PCT No.: PCT/AU2012/001435
§ 371 (c)(1),
(2) Date: May 15, 2014

(87) PCT Pub. No.: WO2013/075168
PCT Pub. Date: May 30, 2013

(65) Prior Publication Data
US 2014/0327239 A1 Nov. 6, 2014

Related U.S. Application Data

(60) Provisional application No. 61/635,417, filed on Apr. 19, 2012.

(30) Foreign Application Priority Data

Nov. 21, 2011 (AU) .............................. 2011904859

(51) Int. Cl.
*F16L 23/00* (2006.01)
*F16L 13/02* (2006.01)
(Continued)

(52) U.S. Cl.
CPC .............. *F16L 13/02* (2013.01); *F16L 13/08* (2013.01); *F16L 21/00* (2013.01); *F16L 23/00* (2013.01);
(Continued)

(58) Field of Classification Search
CPC .... F16L 23/028; F16L 23/0283; F16L 23/162
See application file for complete search history.

(56) References Cited

U.S. PATENT DOCUMENTS 1,935,673 A * 11/1933 Smith ...................... F16L 23/02
 285/328
2,024,579 A * 12/1935 Johnson ................ F16L 41/082
 137/171
(Continued)

FOREIGN PATENT DOCUMENTS

DE 2838497 A1 * 3/1980 .......... F16L 23/0283

OTHER PUBLICATIONS

Industrial Fasteners Institute, Galvanic Compatibility (Corrosion), Dec. 2007 [online], [retrieved on May 28, 2018]. Retrieved from the internet, URL: http://www.theboulderco.com/products-specifications/product-specifications-01.pdf>.*
(Continued)

*Primary Examiner* — Anna M Momper
*Assistant Examiner* — James A Linford
(74) *Attorney, Agent, or Firm* — Stevens & Showalter, L.L.P.

(57) ABSTRACT

An improved coupling system for joining two items together, typically in the form of copper pipes, to other copper pipes, or in the form of other fittings, includes a pair of flange couplings, each of which is independently secured to one of the items to be joined together so that when the two flange couplings are securely joined to each other by suitable fasteners received through fastening apertures in the two flange couplings, the two items are sealingly joined to one another to form a substantially water tight junction. The improvement being that the bare metal parts of the ferrous components of the coupling are coated with a protective coating, such as a copper coating, so that there is no direct contact between two dissimilar metals thereby inhibiting or
(Continued)

preventing corrosion of the metal components of the coupling due to electrolytic or galvanic action arising from direct contact between the two dissimilar metals.

20 Claims, 4 Drawing Sheets (51) Int. Cl.
    *F16L 58/18*     (2006.01)
    *F16L 58/08*     (2006.01)
    *F16L 13/08*     (2006.01)
    *F16L 21/00*     (2006.01)
    *F16L 25/00*     (2006.01)

(52) U.S. Cl.
    CPC ........... *F16L 25/0072* (2013.01); *F16L 58/08* (2013.01); *F16L 58/187* (2013.01); *Y10T 29/49826* (2015.01)

(56) References Cited

U.S. PATENT DOCUMENTS

| | | | |
|---|---|---|---|
| 3,213,187 A * | 10/1965 | Kish | F16L 21/04 174/78 |
| 4,960,296 A | 10/1990 | Thelen et al. | |
| 5,687,995 A | 11/1997 | Mori et al. | |
| 2006/0022466 A1 * | 2/2006 | Sand | F16L 23/006 285/412 |
| 2010/0193063 A1 * | 8/2010 | Shimizu | B22D 11/005 138/146 |
| 2012/0067441 A1 * | 3/2012 | Korus | A01G 25/00 137/561 R |

OTHER PUBLICATIONS

Mcdonald, Mandy; Notice of Acceptance; New Zealand Application No. 624559; dated Apr. 14, 2016; New Zealand Intellectual Property Office; Wellington, New Zealand.
Stanley, Gary; Text of New Zealand Patent No. 624559, having an Advertisement of Acceptance dated Apr. 29, 2016; Grant date Aug. 2, 2016; New Zealand Intellectual Property Office; Wellington, New Zealand.
Nagel, Matthew; First Examination Report; New Zealand Application No. 624559; dated Jan. 14, 2015; Intellectual Property Office of New Zealand.
"Corrosion Theory", Galvanic Series, Metal Handbook American Society for Metals, 1985, p. 29.53.
Xingcun Colin Tong, "Characterization Methodology of EMI Shielding Materials", Advanced Materials and Design for Electromagnetic Interference Shielding, 2009, p. 59, CRC Press.
Petr Vansek, "Electrochemical Series", Handbook of Chemistry and Physics, 92nd Edition, Chemical Rubber Company, 2011.
Bimetallic Corrosion, The National Corrosion Service, National Physical Laboratory, 2000, p. 3.
"Galvanic Compatibility", AC Pools, 2015, retrieved from www.acpools.com.au.
Espacenet English Machine Translation of German Publication No. DE2838497.

* cited by examiner

COATED FLANGED COUPLING

FIELD OF THE INVENTION

The present invention relates generally to connectors which are used as couplings for joining one component to another component.

In one form, the present invention relates to connectors in the form of couplings for joining two items together in which the coupling comprises two separate components which cooperatively interact with each other to join the two items to each other.

In one form, the present invention relates to connectors in the form of flanged couplings of the type for joining two conduits together to allow fluid flow between the two conduits in which the connectors provide a substantially fluid tight seal between the conduits.

In one form, the present invention finds particular application as a flanged coupling for joining two conduit members to one another in which the two components of the flanged couplings are connected to each other and each component directly interacts with one of the conduits so as to join the two conduits to one another through the coupling.

Although the present invention will be described with particular reference to one embodiment of the connector in the form of a flange coupling, it is to be noted that the protection provided is not restricted to the described embodiment but rather the scope of protection is more extensive so as to include other forms and arrangements of the connector and/or the coupling and their component parts and to the use of the various forms and arrangements of the connectors and couplings and their component parts in applications other than described.

BACKGROUND OF THE INVENTION

Flange couplings are available to join two tubular conduits to one another in a fluid tight manner allowing passage of fluid from one conduit to another without leaks occurring between the conduits or where the two conduits are joined to each other. The conduits can have any suitable form, such as for example, tubular pipes, valves, taps, or other fitting used in conveying fluids from one location to another location in which one or more parts of one conduit is joined to one part of a second conduit, including conduits requiring two or more connections to other conduits.

Initially, the flange of the coupling connector, or other fitting, was made from metal, particularly unprotected metal, such as for example, steel having exposed bare surfaces, that were susceptible to corrosion. In many instances, the conduit to which the connector or fitting was attached was made from copper or a copper alloy. When a pair of flange couplings having bare exposed metal surfaces were located in opposed face-to-face relationship to each other, say at the end of one pipe to join the pipe to a fitting, such as for example, the inlet or outlet of a valve, electrolysis action often occurred between the two dissimilar metals of copper and steel, particularly in environmental conditions conducive to such action, such as for example in moist or wet conditions after encountered underground. The electrolysis action often resulted in electrolysis corrosion of the steel coupling, copper tube, or both leading to a failure of the junction between them thereby resulting in leakage of the contents of the copper pipe at or close to the junction.

One attempt to address the electrolysis action was to provide a gasket or similar between the copper tube and one of the components of the steel flange coupling. Typically, the gasket acted to isolate or insulate the steel flange coupling from the copper pipe or similar, to prevent the steel flange from coming into contact with the copper tube in an attempt to prevent corrosion. However, over time, the gasket deteriorated or degraded leading to failure of the integrity of the gasket allowing direct contact between the exposed bare surface of the steel flange and the surface of the copper pipe which in turn resulted in electrolysis taking place due to the two dissimilar metals being in contact with each other in a wet or moist environment leading to corrosion. Thus, there is a need for an improvement in joining a copper pipe to another fitting including a second copper pipe which reduces or eliminates the chance of electrolytic corrosion occurring between the pipe and the connector where the metals of the pipe and connector are dissimilar.

Another disadvantage of having to use a gasket or similar to separate the flange coupling from the pipe, is the added cost and effort during manufacture and packaging to provide the correct size gasket for the size of the pipe, or pipe fitting, sleeve or the like, and to place the correct gasket with the steel flange in the package containing the flange connector as well as having to install the gasket over the pipe during assembly of the installation which requires extra care and attention as well as additional time to align all of the components needed to form the junction.

Accordingly, it is an aim of the invention to provide an improved connector for joining a conduit to either another conduit or to a fitting in which the connector includes one or more flange couplings having improved corrosion resistance.

Accordingly, it is an aim to provide a flange coupling which has improved longevity and is more durable by having increased corrosion resistance to the adverse effects of electrolytic or galvanic corrosion.

Accordingly, it is an aim to provide a flange coupling or connector having a protective layer or coating which renders the flange coupling more resistant to electrolytic corrosion by changing the electrolytic or galvanic characteristics of the flange coupling.

Accordingly, it is an aim of the present invention to more closely match the electrolytic characteristics of the connector to the conduit to reduce or eliminate the incidence of electrolytic corrosion.

Accordingly, it is an aim to provide a flange coupling having a protective layer in which the protective layer is matched to the material of the items being joined to each other so as to have the same or similar electrolytic or galvanic characteristics to the items being joined by the connector to reduce the occurrence of electrolytic corrosion.

It is to be noted that not all embodiments of the invention satisfy all aims or objective. Some embodiments will satisfy one aim, whilst other embodiments will satisfy other aims. Some embodiments will satisfy two or more aims of the invention.

SUMMARY OF THE INVENTION

According to one form of the present invention, there is provided a connector in the form of a coupling for joining two conduit members to one another, comprising
  a first conduit member made from a first material having
    a first electrolytic or galvanic characteristic,
  a coupling element made from a second material having
    a second electrolytic or galvanic characteristic,
  the coupling element for use in joining the first and second
    conduit members to one another, the first material having the first electrolytic or galvanic characteristic which is different to the second material having the second electrolytic or galvanic characteristic, wherein the first coupling element is treated to change the electrolytic or galvanic characteristic of the first coupling member from the second electrolytic or galvanic characteristic to be similar to or the same as the first electrolytic or galvanic characteristic so as to match the first electrolytic or galvanic characteristic of the first conduit member for inhibiting electrolytic or galvanic corrosion occurring between the first conduit member and the coupling element when the coupling element is in contact with the first conduit member when joining the two conduit members to one another.

According to one form of the present invention, there is provided a connector in the form of a coupling for joining two conduit members to one another, comprising a first conduit member made from a first material having a first electrolytic or galvanic characteristic, a second conduit member made from the first material, a first coupling element made from a second material having a second electrolytic or galvanic characteristic, a second coupling element made from the second material, the second coupling element being associated with the second conduit member, the first electrolytic or galvanic characteristic being different from the second electrolytic or galvanic characteristic, said first and second coupling elements each having an external coating of the first material, wherein when the first and second coupling members are arranged with respect to each other so that when the first coupling element is associated with the first conduit element and the second coupling element is associated with the second conduit member and the first coupling element is connected to the second coupling element, the first conduit member is connected to the second conduit member such that the coating of the first coupling element is in intimate contact with the first conduit member to reduce and/or prevent an electrolytic or galvanic cell being formed between the first conduit member and the first coupling element.

According to one form of the present invention, there is provided a connector for joining a first item made from a first material to a second item made from the first material comprising a first connector element made from a second material associated with the first item, and a second connector element made from the second material associated with the second item, said first and second connector elements capable of being cooperatively connected to one another, said first material being different to the second material said first connector element and said second connector element each having an external coating of the first material covering at least part of the external surface of each connector element wherein when the first item is joined to the second item by the first and second connector elements cooperatively engaging with one another, there is no direct intimate contact between the first item and the second material of an uncoated part of the surface of the first coupling element and no direct intimate contact between the second item and the second material of an uncoated part of the surface of the second connector element thereby inhibiting or preventing corrosion occurring between the first item and the first connector element and/or between the second item and the second connector element due to the first material being different to the second material.

According to one form of the present invention, there is provided a corrosion resistant connector system comprising a first conduit member made from a first material, a second conduit member made from a first material, a first coupling element made from a second material, a second coupling element made from the second material, the first material being different to the second material, said first and second coupling elements having an external coating for covering at least the surface of each element, wherein when the first and second coupling elements are fastened to each other, the first and second conduit members are connected to one another in fluid communication, wherein the first and second coupling elements each have an external coating for covering at least part of the external surface of each coupling element so that when the conduits are joined to one another by the coupling elements, there is no direct intimate contact between the first conduit member and an uncoated part of the surface of the first coupling element and no direct intimate contact between the second conduit member and an uncoated part of the surface of the second coupling element thereby inhibiting or preventing corrosion occurring between the respective conduit member and coupling elements due to the conduits and couplings being made from different materials.

According to one form of the present invention, there is provided a first connecting element for use in joining a first item to a second item by cooperatively engaging with a second connecting element, said first connecting element having a coating over at least a part of the external surface of the connecting element, wherein when the first connecting element cooperatively engages with the second connecting element to join the first item to the second item, there is no direct intimate contact between the first item and an uncoated part of the surface of the first connecting element to cause corrosion between the connecting element and the first item due to the first material being different to the second material.

According to one form of the present invention, there is provided a first connecting element for use in joining a first item to a second item by cooperatively engaging with a second connecting element, said first connecting element having a coating over at least a part of the external surface of the connecting element, wherein when the first connecting element cooperatively engages with the second connecting element to join the first item to the second item, the first item remains free of intimate direct contact with the connecting element so as to inhibit or prevent corrosion occurring between the first connecting element and the first item due to the first material being different to the second material.

According to one form of the present invention, there is provided a method of joining a first item made from a first material to a second item using a connector having a first connecting element and a second connecting element made from a second material, the first material being different from the second material, and the first and the second connecting elements each having an external coating covering at least a part of the surface of each respective connecting element, the method comprising the steps of associating the first connecting element with the first item, associating the second connecting element with the second item, cooperatively engaging the first and second connecting elements with each other to join the first item to the second item, wherein when the first and second items are joined to one another by the first and second connecting elements, there is no direct intimate contact between the first item and an uncoated part of the surface of the first connecting element to cause electrolytic corrosion between the first item and first connecting element due to the first material being different to the second material.

BRIEF DESCRIPTION OF ASPECTS OF EMBODIMENTS OF THE INVENTION

Galvanic corrosion, sometimes referred to as electrolytic corrosion, is an electrochemical process in which one metal corrodes preferentially to another when both metals are in electrical contact and immersed in an electrolyte.

Two or more dissimilar metals and alloys have different electrode potentials so that when two or more of the dissimilar metals or alloys came into contact in an electrolyte, a galvanic couple is established with one of the metals acting as the anode and the other as the cathode. The difference between the relative potentials of the two dissimilar metals causes the corrosion by being the force that moves charged particles through a circuit set up between the two metals, i.e. the anode and the cathode of the circuit in which the anode dissolves into the electrolyte and deposition is formed on the cathode. The charge particles that move include both electrons and ions.

Copper and steel used in piping and fittings that are in direct intimate contact, i.e. directly touching one another in a moist or damp environment, can form a galvanic cell when in electrical connection with each other, which contributes to accelerated corrosion of the system. In the past, chemical corrosion inhibitors have been introduced into the pipes to reduce galvanic potential but with very limited success. Often it is not practical or possible to introduce inhibitors into the liquids being conveyed through the pipes and thus, galvanic corrosion can occur.

Although there are two basic mechanisms by which metals in electrolytes corrode which are electrolytic corrosion and galvanic corrosion, each being different to the other, and there being other types of corrosion such as bi-metallic corrosion and others, the use of such terms, including electrolytic and galvanic, will be used interchangingly in the specification so that the scope of protection includes all such terms.

Typically, the terms electrolytic and/or galvanic characteristics used when describing the materials and/or items to which the present invention is applicable, refer to the potential energy of the materials, such as the metals, copper, steel and alloys containing such metals, and the relative position of the various metals, alloys and combinations on the Galvanic Energy Level Table, Electrochemical Table, Anodic Index, measured in volts, electrovolts (eV), millivolts (mV) or the like which are measures of the electrochemical voltage that will be developed between a particular metal and a reference metal or standard metal.

Typically, the connector includes one or more connecting elements, which in one form is a coupling having two parts or components. In one form, the coupling is a flange coupling or connector. More typically, the coupling is a pair of flange couplings or joining rings in which there is a first flange and a second flange which cooperatively connect to one another to form the connector.

In one form, the flange coupling or connector includes a separate component, such as for example, a ring. In one form, the flange connector or coupling is part of another component, such as for example, is one end of a valve, tap, elbow piece, reduction adaptor or any other type of fitting used in providing fluid flow from one location to another location, such as in a plumbing installation, sewage installation, chemical engineering installation, drainage installation or the like in which liquid is conveyed. In one form, the fluid is a liquid. In another form, the fluid is a gas. In a further form, the fluid is a liquid/gas mixture. In other forms, the liquid can include solid particles, such as dissolved solid particles, suspended solid particles or the like.

Typically, the component being joined to another component is the inlet or outlet of a valve, tap, adaptor or similar for joining the component to a conduit such as a pipe or similar.

In one form, the flange is provided with a multitude of fastening apertures for receiving fasteners therethrough, typically individual fasteners. Typically, there is from 2 to 16 fastening apertures, preferably from 4 to 12 apertures, most preferably from 4 to 8 apertures. In one form, the fastening apertures are located in regularly spaced apart locations circumferentially around the peripheral edge of the flange, coupling or in a border or margin area of the coupling.

In one form, the flange being substantially circular can be attached in a number of different orientations or positions. In other forms, the flange can be attached in a reduced number of selected orientations or can be attached in a single orientation only to be uniquely connected to the conduit member.

Typically, the size of the flange coupling varies from a size suitable for joining a conduit having a size, typically a diameter of about 15 mm inside bore, to about 400 mm inside bore (i.e. pipe diameter), preferably from about 65 mm to about 100 mm inside bore diameter of pipe being joined by the flange connectors.

In one form, the flange connector or coupling is circular. However, in other forms, the flange can have other shapes, such as example, part circular, square, rectangular, D-shaped, oblong or other simple shapes. The flange can be of any suitable or convenient shape.

In one form, the internal walls of the apertures or bores of the apertures are smooth. In one form, the internal surface of the bores or walls are internally threaded to threadingly receive suitable fasteners, such as for examples, threaded fasteners, such as bolts or the like having external threads. In other forms, the inside of the apertures can have any suitable shape, profile or surface treatment.

In one form, the flange coupling is provided with a wall, typically, two walls, being an inner wall and an outer wall. In one form, the wall or walls are substantially parallel to one another and are substantially smooth. However, the walls can have or be provided with surface treatments. Typically, the two walls are spaced apart from each other in accordance with the thickness of the flange. It is to be noted that the flanges can have any suitable or desirable thickness.

Typically, the flange coupling is provided with a centrally located or oriented orifice or the like. In one form, the central orifice is an opening, aperture, bore, hole, cavity, space or the like. More typically, the orifice is for receiving therein or therethrough one of the conduit members or items to be joined to another member or item, such as for example, the end of a pipe or other fitting.

In one form, the first item or member is a conduit member or similar. Typically, the conduit member is a hollow tube, pipe, vessel, insert, section, sleeve, passage, duct or the like. Typically, the pipe or tube is cylindrical. More typically, the outside diameter of the conduit approximates the internal diameter of the orifice of the flange coupling or connector. In one form, the insert or sleeve is located within the orifice, and a tube or pipe is received through the sleeve or insert in the orifice so that the flange coupling receives both the pipe and sleeve in the orifice. Typically, one end of the pipe, insert, sleeve or similar, is received through one coupling and abuts against the other coupling. More typically, one of the ends of the insert, sleeve, pipe or similar is located intermediate the two flange couplings when joined to one another.

In one form, the pipe is joined to the insert, sleeve or similar by one end of the pipe being received within the body of the sleeve or insert. In one form, the pipe is joined to the sleeve or insert mechanically or by an adhesive or bonding agent, such as for example, by being soldered, crimped, welded or the like, or by using a suitable fastener.

When joining two pipes, typically of copper or copper alloy, one pipe is received in one sleeve having a flange and the other pipe is received in a second sleeve also having a flange in which the flanges of the sleeves are both located intermediate the flange couplings to join the two pipes to each other by sandwiching the flanges of the sleeves between the two flange couplings.

In one form, at least one end of the insert, sleeve, pipe or tube is enlarged or is provided with an enlarged head. In one form, the end is swaged, flared or similar. Typically, the enlarged end is, or is provided with, a flange, ring or similar. Typically, the diameter of the flange of the insert, sleeve, pipe or tube is larger than the diameter of the orifice of the flange coupling or connector in which the body of the sleeve or insert is received so as to be locatable between two flanges of the couplings.

In one form, the conduit is a pipe having an integral flange at one end, or flanges at both ends. In one form, the pipe has a sleeve for fitting over one end of the pipe in which the sleeve has a body portion and a flange portion in which the end of the pipe is received within the body portion and the flange abuts against the flange coupling or connector to join the pipe.

In one form, the conduit is a pipe made from copper pipe or a copper containing alloy or the like.

In one form, the orifice is circular. In one form, the orifice can have any suitable shape, profile or size to match the size, shape or profile of the pipe or sleeve received therethrough.

In one form, the coupling flange is made from metal, typically, from steel or other ferrous or ferrous containing metal, such as for example, a treated steel, such as stainless steel, mild steel or the like.

In one form, the external surface of the flange coupling is coated or provided with a coating. Typically, the coating is made from or deposited as a metallic coating in which the coating is made from a non-ferrous or non-ferrous containing metal. Typically, the non-ferrous metal is copper, nickel, chromium or the like including alloys or combinations thereof. Preferably, the coating is or contains copper.

In one form, the external coating is a uni-layer of non-ferrous metal, i.e. a mono-layer, or is a dual layer or multi layer of metal. Typically, each layer of the dual layers or multi-layers, is applied one at a time over spaced apart timed intervals to the coupling. In one form, the coating is of a laminate or layered structure of two or more coatings or layers of the same or different materials. Typically, the coating comprises at least one inner layer and at least one outer layer. Typically, the inner layer is in direct intimate contact with the metal of the flange coupling. Typically, the outer layer or outermost layer is of a different galvanic characteristic or electrolytic characteristic than the coupling to which the coating is applied so as to change the galvanic or electrolytic characteristic, i.e. the electrochemical potential of the coupling. Preferably, the outer layer is a metal coating of a metal dissimilar to the metal from which the flange coupling is manufactured. More typically, the outer or outermost layer is made from the same material, typically the same metal, as is the item being joined by the flange connector, i.e. the pipe. In one form, the flange at the end of the pipe, or provided on the insert, sleeve or similar engages with the flange coupling. In one form, there is direct intimate contact of the flange coupling and the insert or sleeve, particularly the flange portion of the insert or sleeve in which the coating of the flange coupling is the same or substantially the same as the metal of the flange of the pipe, sleeve, insert or the like.

In one form, the external coating includes a coating of a layer of copper. In one form, the external coating includes a coating of a layer of chromium or nickel in which the nickel or chromium layer is an inner layer directly adhered to the surface of the steel from which the coupling is made and the copper layer is applied to the inner nickel or chromium layer.

In one form, the copper layer is deposited as a layer of copper plating, such as for example, by electroplating. Typically the copper plating includes one or more of
 (i) An alkaline-complexed bath involving the use of a cyanide or a non-cyanide bath or the like.
 (ii) An acid bath, such as for example a sulphate complex bath or a fluoroborate complex bath, or the like.
 (iii) A mildly alkaline bath such as a pyrophosphate complexed bath.

Typically, the thickness of the copper layer is from about 0.5 to about 100 microns, preferably from about $1\mu$ to about $80\mu$, more preferably from about $5\mu$ to about $5\mu$, most preferably from about $10\mu$ to $50\mu$ or other suitable ranges.

Typically, the layer of chromium or nickel is from about $0.1\mu$ to about over $100\mu$ or the like. However, it is to be noted that the inner layer and outer layer can have any suitable thickness.

In one form, the layer of copper, chromium or nickel is formed by electroless plating in which chemical reactions are used to deposit the layer of metal onto the connector and/or other metal layers onto the connector.

In one form, the inner layer is a co-layer of two or more different metals, such as for example, an alloy of two or more different metals, such as chromium and nickel.

In one form, there is an intermediate layer or tie layer located between the inner layer and outer layer. Typically, the tie layer or intermediate layer promotes adhesion between the individual layers applied to the coupling element, preferably, the outer copper layer.

Typically, the inner layer applied to the surface of the flange coupling or connector is a metal layer, such as for example, containing nickel or chromium layer, more typically, a nickel or chromium layer that is electroplated onto the steel surface of the flange coupling.

Typically, the outer layer is a copper or copper containing layer, such as for example, a copper layer, copper alloy layer, brass layer, (typically an alloy of at least copper and zinc), or bronze layer, (typically an alloy of at least copper and tin), or similar. The alloys of copper can have other metal components or be of other metal containing compositions. Typically, the outer layer is applied by electroplating, chemical vapour deposition (CVD), spluttering, or other electro-plating and/or deposition techniques or the like, including electroless plating using chemical reactions to plate, coat or cover the surfaces of the flange coupling or connector.

In one form, the entire outer or external surfaces or exposed surfaces of the coupling flange, including the exposed surfaces inside the orifices, apertures or bores of the flange coupling are coated to conceal all of the ferrous metal of the connector or coupling so as to not leave any exposed bare ferrous metal on the surface of the coupling.

BRIEF DESCRIPTION OF THE DRAWINGS

Embodiments of the connector and/or coupling will now be described to illustrate forms of the coupling by way of example only with reference to the accompanying drawings in which.

DETAILED DESCRIPTION OF AN EMBODIMENT

Figure 6:
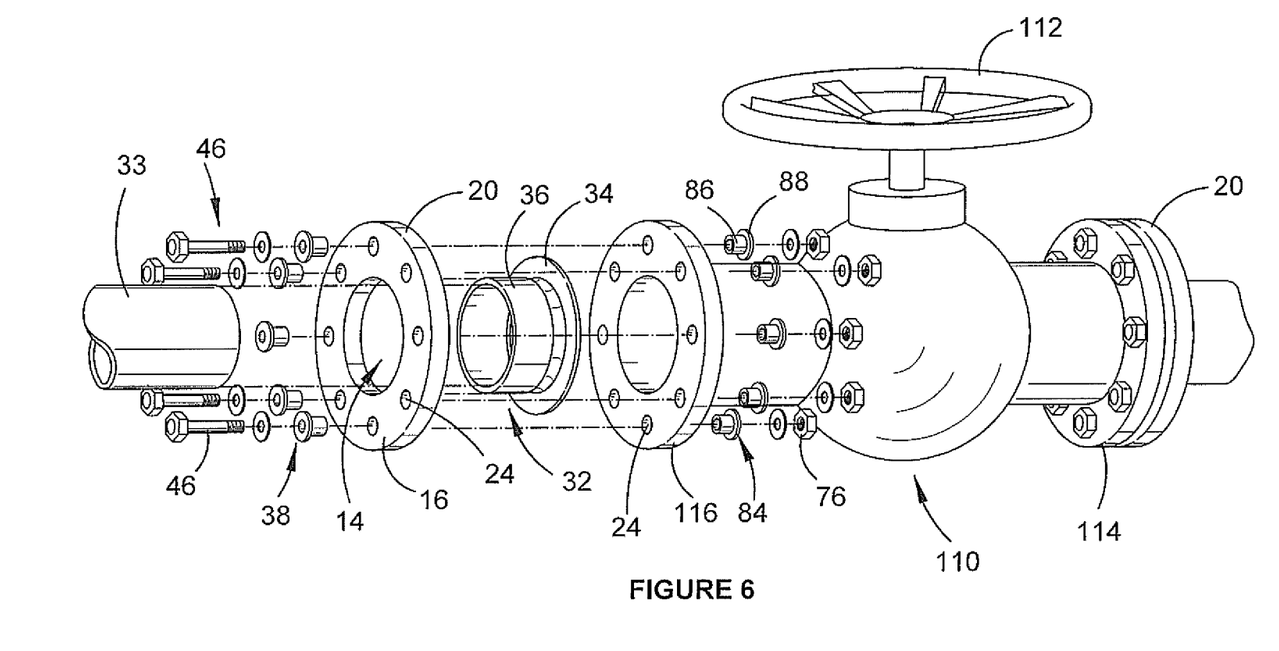
FIG. 6 is an exploded view of another embodiment of the connector for joining a port of a valve to a pipe.

In the drawings, there is shown various views of one form of a connector system useful for joining two pipes to one another. It is to be noted that in this embodiment, the connector is being used to join two substantially identical pipes together. Other embodiments are used to connect a pipe to a fitting, such as for example, a valve or tap, or more particularly, the inlet and/or outlet of the valve or tap for admitting liquid to or discharging liquid from the valve or tap. One alternative is shown in FIG. 6. Also, it is to be noted that the described embodiment is illustrated with respect to joining two sleeves together in which the pipes are received in the sleeves. Other embodiments include joining a pipe and sleeve combination to another type of fitting, such as a valve or tap, including the conduit portions of the valve or tap.

Figure 1:
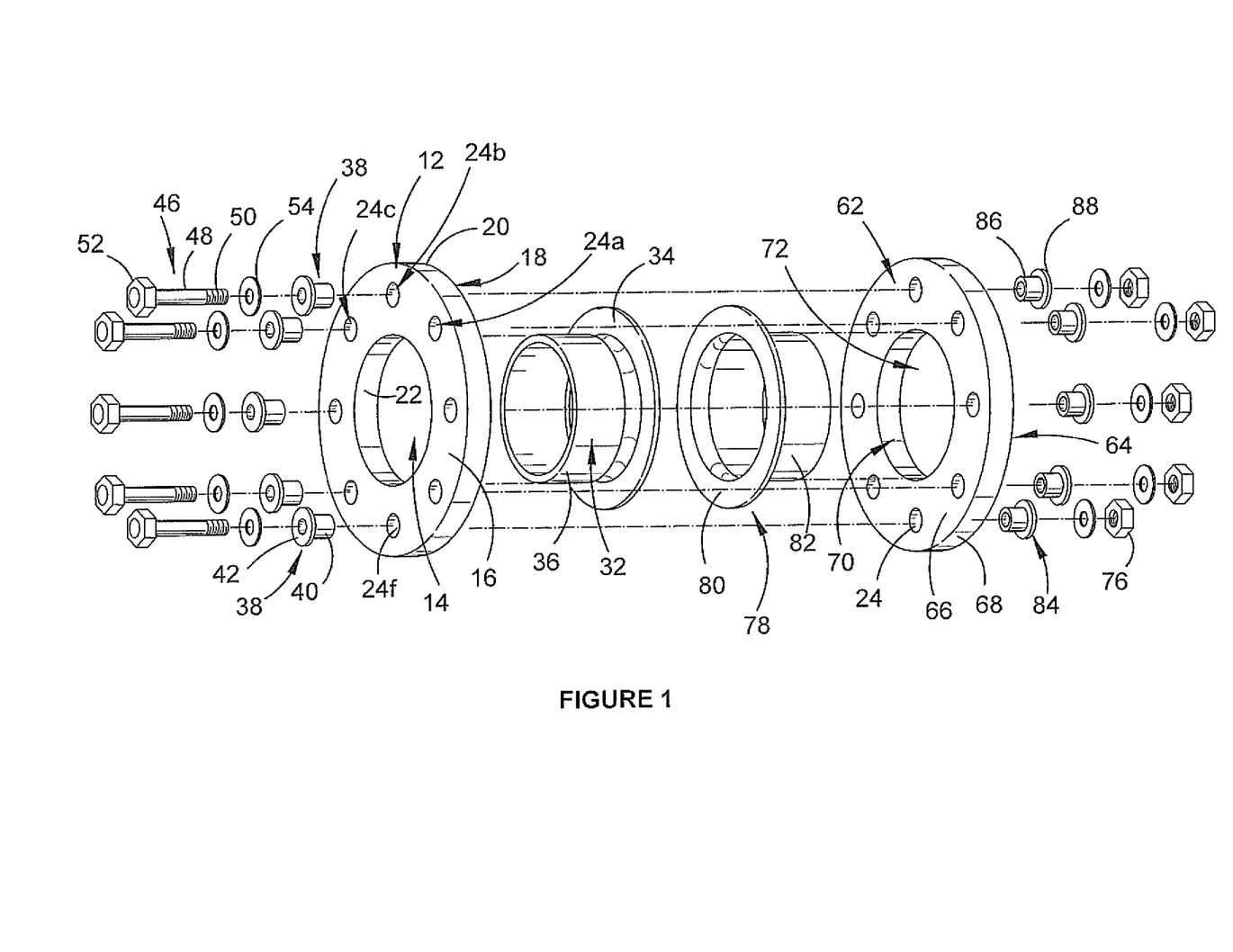
FIG. 1 is an exploded view of the component parts of one form of the coupling connector.
Figure 2:
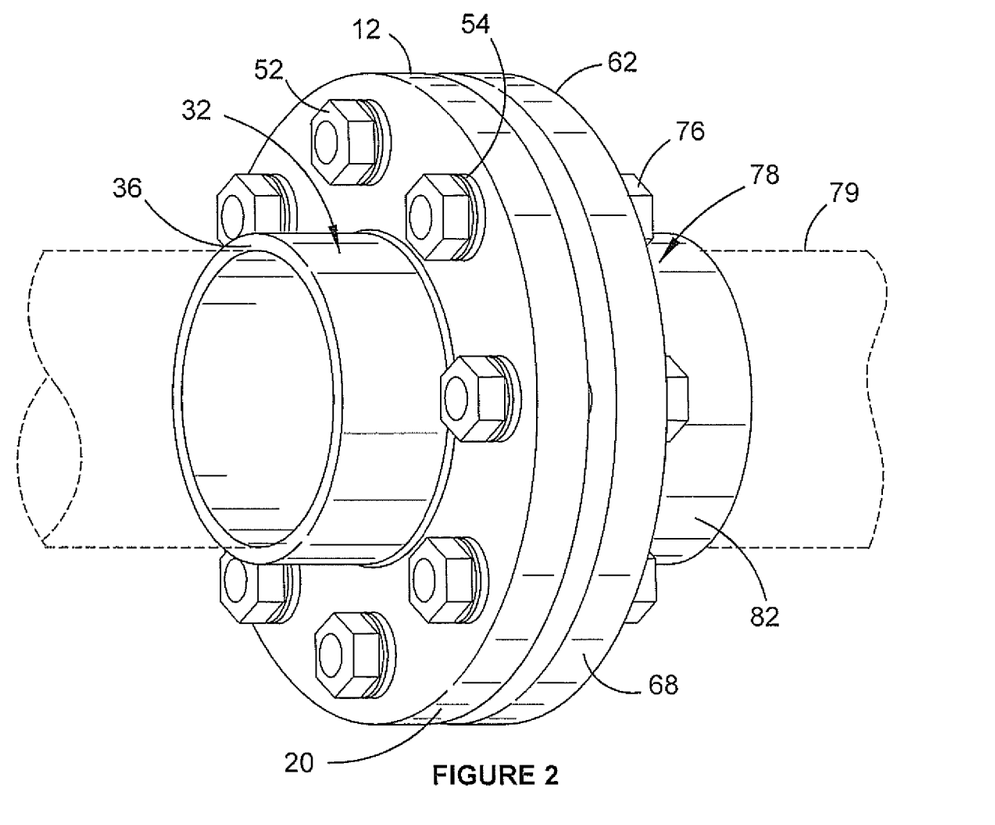
FIG. 2 is a perspective view of the coupling/connector of FIG. 1 in a connected configuration in use for joining two pipes to one another.
Figure 3:
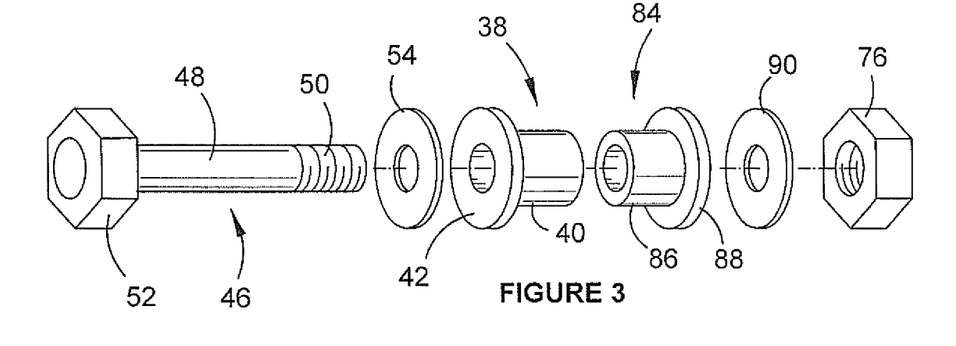
FIG. 3 is an exploded view of one form of fastener for joining two flange couplings or connectors to one another.

In one form, there is a first flange coupling, generally denoted as 12, located at or towards the left hand side of FIG. 1. Flange coupling 12 is generally circular in shape being of an annular form having a centrally located relatively large size orifice 14 of a size, shape and profile corresponding to the size, shape and profile of a first sleeve 32, particularly the external diameter of the body 36 of the sleeve 32, which is received within orifice 14 in preparation of joining two conduit members to one another. It is to be noted that a pipe 33 (not shown for clarity in FIGS. 1 to 3, but shown in FIGS. 4 and 5,) is received within sleeve 32. In one form, pipe 33 and sleeve 32 combination, is one form of one conduit, typically the first conduit. There are other forms of the first conduit, such as for example, the sleeve, or the pipe, or both.

Flange coupling 12 is generally cylindrical having a first surface, referred to as an obverse face 16 located on one side and facing outwardly in use. Flange coupling 12 has a second surface, referred to as a reverse face 18 located on the opposite side facing inwardly toward a second flange coupling 62 to which first flange coupling 12 is connected in use to join the two conduit members.

Flange coupling 12 is provided with a circumferentially curved outer side wall 20, generally referred to as the thickness of the flange coupling, extending between the first surface 16 and the second surface 18 and with an inner curved side wall 22 forming the inner surface of centrally located orifice 14. In one form, all of surfaces 16, 18, 20, 22 are generally smooth. However, the surfaces may be treated to assist application of a protective covering thereover as will be described in more detail later.

In one form, flange coupling 12 is provided with eight relatively small diameter apertures 24a, 24b, 24c, 24d, 24e, 24f, 24g, 24h located at regularly spaced apart locations around the perimeter of the circular faces 16, 18 of coupling 12 to form fastening apertures to assist in joining flange couplings 12, 62 to one another to be described in more detail later in the specification. In one form, flange couplings 12, 62 are made from steel or other essentially ferrous materials.

Figure 4:
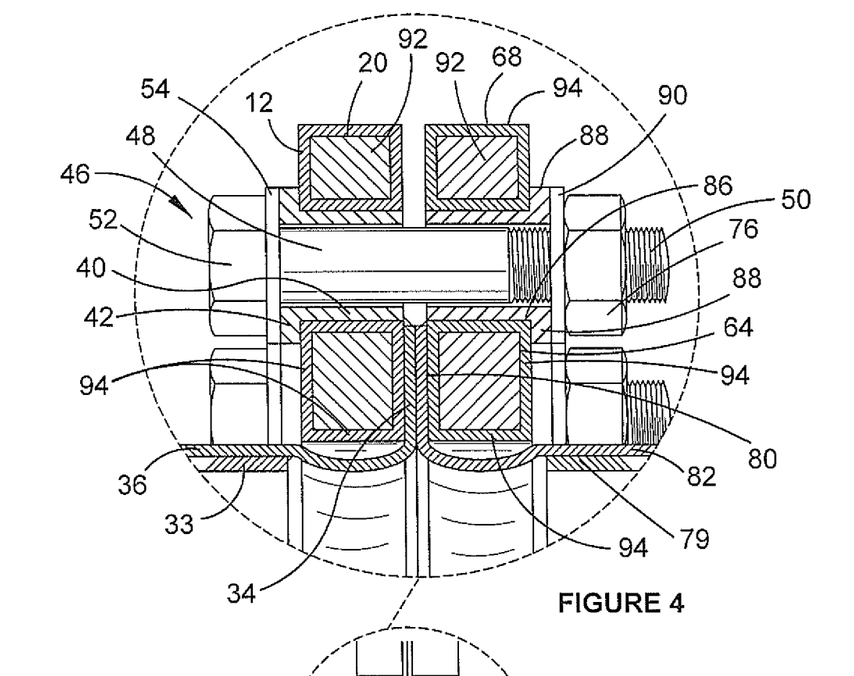
FIG. 4 is an enlarged view of circle A of FIG. 5 showing the layered structure of the external coating applied to the flange connector.
Figure 5:
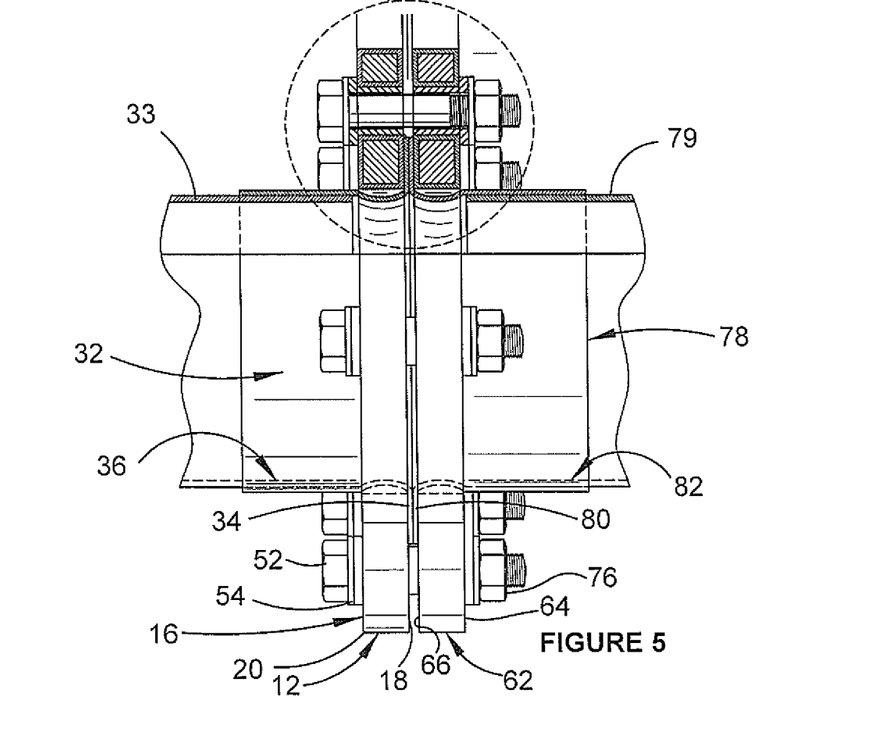
FIG. 5 is a partial cross-sectional view/partial side elevation view of the connector showing the layered arrangement of the external coating applied to all exposed surfaces of the flange connector.

Flange couplings 12, 62 are each made from steel as indicated by 92 of FIG. 4, such as for example, a mild steel or other steel material, and are provided with an external coating 94 to provide a protective coating or covering over the entire outer surface including the inside walls of circular orifice 14 and the inside walls of fastening apertures 24 to provide a more or less substantially uniform coating over the entire exposed steel surface of each flange coupling 12, 62. In one form, the coating is a copper coating or a coating containing copper or an alloy of copper, herein referred to as being the copper coating for ease of reference. In one form, there is an inner coating (not shown). Typically, the inner coating is a chromium coating, a chromium-containing coating or a coating of a chromium alloy or the like whereas the outer coating is the copper coating.

A first conduit member in the form of a sleeve 32 is provided contiguously with first flange coupling 12. In one form, sleeve 32 comprises a flange 34 located at one end thereof and a body portion 36 extending from flange 34 to the other end of sleeve 32. In one form, sleeve 32 is formed with body 36 and flange 34 being integrally arranged such that flange 34 is formed at the end of body 36 by spinning the metal at the end of sleeve 32 to form flange 34. It is to be noted that the outside diameter of body 36 of sleeve 32 is about the same as the internal diameter of orifice 14 of flange coupling 12 so as to be received in or through orifice 14 when joining two pipes together. In one form, sleeve 32 is made from copper or a copper-containing alloy. Pipe 33, also made from copper, is received in sleeve 32 as shown more particularly in FIGS. 4 and 5.

A first generally plug shaped hollow insert 38, typically made from a plastics or other non metallic material, having a generally annular transverse cross-section is provided in each fastener aperture 24a to 24h from the obverse face of coupling 12. Insert 38 has a lengthwise extending body or shank portion 40 in the shape of a hollow cylinder and an enlarged head portion 42 in the form of an annular disc integrally formed with hollow shank 40. It is to be noted that the external diameter of shank portion 40 is about the same or slightly smaller than the internal diameter of fastening aperture 24 so as to be securely located in aperture 24 to protect the coated surfaces of flange coupling 12, particularly around each aperture 24 and the wall of the bores of apertures 24 from coming into contact with the exposed bare surface of a bolt 46 received within the opening 24 of insert 38. Bolt 46 is usually made from steel or other ferrous material. Bolt 46 is provided with a shaft 48 having a threaded section 50 located at or towards the one end around the external circumference and a hexagonal shaped head 52 located at the other end. A washer 54 typically made from the same material as nut 46, such as steel or other ferrous material, or insert 38 such as for example, made from a plastics material, such as nylon or other engineering plastic material, is located between head 52 of bolt 46 and head 42 of insert 38.

A similar arrangement is provided on the right hand side of the connector system where there is second flange coupling 62 having an obverse face 64, a reverse face 66, a curved outer circumferentially extending side wall 68, a curved inner side wall 70, surrounding a centrally located orifice 72 for use with a second conduit member. Coupling 62 is made from a steel based material, such as for example, mild steel 92, and is coated with a copper or copper alloy coating 94, having the same composition as the second conduit which in this embodiment, is a copper sleeve 78 so as to inhibit galvanic corrosion through direct contact of two dissimilar metals.

Flange coupling 62 is provided with eight fastener apertures 74a to 74h, located at regularly spaced apart locations circumferentially around the perimeter of the flange.

In one form, a second conduit in the form of sleeve 78 is provided with a flange 80 located around the inboard end in use and a body section 82 corresponding to the diameter of sleeve 78. A pipe 79, (not shown in FIGS. 1 to 3 of the drawings for clarity, but shown in FIGS. 4 and 5) is received within the bore of sleeve 78. Pipe 79 is received within sleeve 78 as shown more particularly in FIGS. 4 and 5. Sleeve 78 is made from copper as is pipe 79. Pipe 79 when received in sleeve 78, is crimped or otherwise fastened to sleeve 78 so as to secure the pipe and sleeve into a single water tight unit.

A set of second inserts 84 having hollow shanks 86 and enlarged annular disc-like heads 88, are received in fastening apertures 74 of second flange coupling 62 in a similar manner to inserts 38 being received in fastening apertures 24 of the first flange coupling 12. Washers 90 are provided intermediate head 88 of insert 84 on the inboard side of nut 76.

Instead of having threaded bolts 46 received through inserts 38 and apertures 24, internally threaded nuts 76 are provided to threadingly engage the externally treated portion 50 of bolt 46 to securely connect the flange couplings 12, 62 to one another with flanges 34, 80 of sleeves 32, 78 sandwiched therebetween the two flange couplings 12, 62 to form a fluid tight seal between flanges 34, 80 of the two pipes 33, 79.

It is to be noted that mostly, nuts 76 and bolts 46 are made from ferrous materials, mainly steel. However, they can be made from other materials such as brass, bronze or the like for selected applications.

In a second embodiment as shown in FIG. 6, there is shown an embodiment in which a pipe is joined to another form of fitting, such as for example, to the outlet of a valve or tap in which the flange coupling is integrally formed with the tap or valve on an outwardly extending projection.

In the embodiment shown in FIG. 6, the same reference numerals are used to denote the same or similar features of the embodiment shown in FIGS. 1 to 5.

In the embodiment of FIG. 6, valve 110 has a handle 112 and two flange couplings 114, 116 located at either opposite end thereof at the end of respective outwardly extending projections. Thus, body 36 of sleeve 32 is received through orifice 14 of coupling 16 to extend outwardly from coupling 16 to receive one end of pipe 33 which is crimped or otherwise fastened to body 36 of sleeve 32. Flange 34 is located intermediate the inwardly directed face 18 of coupling 16, and the outwardly directed face of coupling 116, which is integrally formed at one end of valve 110 to join pipe 33 to valve 110. Coupling 116 is the same as coupling 62 of FIGS. 1 to 5 except that it is formed integrally as part of valve 110, rather than being an individual component. Bolts 46 are received through aligned apertures 24 provided in coupling 116 to threadingly engage with nuts 76. Inserts 38 are provided in apertures 24 to prevent contact of bolts 46 with the copper coating of flange coupling 116. Flange coupling 114, 116 can be copper coated to match the copper of insert 32 so as to inhibit corrosion caused by a galvanic cell of similar metals being established.

In other embodiments, valve 110 can be replaced with any other fitting having a flange which is the same as or similar to flange couplings 16, 62, 116.

By coating all of the exposed metal surfaces of the flange coupling with a copper coating to match the copper of the pipes, there is no direct intimate contact of two dissimilar metals to set up an electrolytic or galvanic cell for causing corrosion. Instead, the metal parts of the coupling system or arrangement including the couplings in intimate direct touching contact with each other, are all of the same or substantially the same metal, most notably copper, so that there is a considerably reduced chance that corrosion will result due to the electrochemical potential difference of the two dissimilar metals forming an electrolytic or galvanic cell or circuit of the type responsible for corrosion.

ADVANTAGES OF THE INVENTION

Copper coating of steel flange is UV resistant, more durable, scratchproof.

Having a copper coating reduces or prevents the need to have other forms of protection, such as for example, washers, gaskets or the like.

Pipes and couplings can be buried underground without additional adverse corrosive effects.

No insulator/gasket required to provide protection so that there is no need to check to see if an insulator gasket is present or is the correct size for receiving a pipe or other conduit.

The plastic inserts can be preinstalled at the factory where the couplings are being made and/or packaged so that there is virtually complete isolation between dissimilar metals.

The copper coating process tends to be more reliable at providing protection.

The copper coating process tends to be more of a failsafe way of providing protection.

Pre-cleaning of the components forming the coupling and/or coupling system can occur in situ rather than during installation or assembly of the pipe line or similar.

No heat required to be applied to the coupling, connector or other parts during installation of the coupling.

Reproducible coating thicknesses is possible, and thus uniform protection provided.

The described arrangement has been advanced by explanation and many modifications may be made without departing from the spirit and scope of the invention which includes every novel feature and novel combination of features herein disclosed.

Those skilled in the art will appreciate that the invention described herein is susceptible to variations and modifications other than those specifically described. It is understood that the invention includes all such variations and modifications which fall within the spirit and scope.

The invention claimed is:

1. A connector in the form of a coupling for joining two conduit members to one another, the coupling comprising a first conduit member made from a first metallic material, a second conduit member, a first coupling element made from a second metallic material, and a second coupling element made from the second material, the second coupling element being associated with the second conduit member, the first and second metallic materials having different positions on the Anodic Index, said first and second coupling elements each having an external coating of the first material, wherein when the first and second coupling elements are arranged with respect to each other so that the first coupling element is associated with the first conduit member and the second coupling element is associated with the second conduit member so as to join the first conduit member to the second conduit member by the coupling, the coating of the first coupling element is in intimate contact with the first conduit member for reducing and/or preventing an electrolytic or galvanic cell being formed between the first conduit member and the first coupling element.

2. A connector according to claim 1 in which when the first conduit member is joined to the second conduit member by the first and second coupling elements cooperatively engaging with one another, there is no direct intimate contact between the first conduit member and the second material of an uncoated part of the surface of the first coupling element and no direct intimate contact between the second conduit member and the second material of an uncoated part of the surface of the second coupling element, so that corrosion occurring between the first conduit member and the first coupling element and/or between the second conduit member and the second coupling element due to the first and second metallic materials having different positions on the Anodic Index, is inhibited or prevented.

3. A connector according to claim 1 in which the coupling is a flange coupling or flange connector, or a pair of flange couplings or joining rings.

4. A connector according to claim 3 in which the flange coupling is provided with a centrally located or oriented orifice or opening, aperture, bore, hole, cavity or base for receiving therethrough one of the conduit members in which the size of the aperture is slightly greater than the outside diameter of the conduit member.

5. A connector according to claim 4 in which the conduit member is an insert or sleeve or is provided with an insert or sleeve in which the insert or sleeve is received within the orifice or opening, of the connector or flange coupling.

6. A connector according to claim 5 in which one end of the conduit member, insert or sleeve is received through one coupling and abuts against a wall of the other coupling, such that one of the ends of the insert, sleeve or pipe is located intermediate the two flange couplings when joined to one another.

7. A connector according to claim 6 in which the conduit member is joined to the sleeve or insert mechanically or by a chemical bonding agent or similar such as by being soldered, crimped or welded.

8. A connector according to claim 1 in which the conduit member is a pipe made from copper or a copper containing alloy.

9. A connector according to claim 1 in which the coating is applied to the external surface of the flange coupling wherein the coating is made from or deposited as a metallic coating in which the metal of the coating is a non ferrous metal or contains a non ferrous metal, in which the non ferrous metal is copper, nickel, or chromium, including alloys or combinations thereof.

10. A connector according to claim 9 in which the external metallic coating is a mono layer or is a dual layer, or is a multi-layer of metal or metal containing material.

11. A connector according to claim 10 in which the metallic coating is a laminate or layered structure of two or more coatings or layers of the same or different materials.

12. A connector according to claim 11 in which the metallic coating comprises at least one inner layer and at least one outer layer in which the inner layer is in direct intimate contact with the metal from which the flange coupling is made.

13. A connector according to claim 12 in which the outer layer is made of a metal of a composition having a position on the Anodic Index which is the same as the position on the Anodic Index of the composition of the metal from which one or both of the conduit members are manufactured.

14. A connector according to claim 12 in which the flange coupling is made from a ferrous material and the coating or the outer layer of the coating is copper or a copper containing material.

15. A connector according to claim 12 in which there is direct intimate contact of at least part of the exterior copper coated flange coupling and at least a part of the exterior surface of the copper insert or sleeve or pipe.

16. A connector according to claim 12 in which the coating includes an inner layer of chromium or nickel which is directly adhered to the surface of the steel from which the coupling is made and the outer layer is a copper layer or made from a copper containing material applied to the nickel or chromium layer so as to alter the electrolytic or galvanic characteristics of the flange coupling.

17. A connector according to claim 16 in which the layer is deposited as a layer of copper plating in which the copper plating is by electroplating, by alkaline complexed bath or acid bath.

18. A connector according to claim 17 in which the thickness of the copper layer is from about $0.5\mu$ to about $100\mu$, preferably from about $1\mu$ to about $80\mu$, more preferably from about $5\mu$ to about $50\mu$, most preferably from about $10\mu$ to about $50\mu$.

19. A connector according to claim 18 in which the layer changing the electrolytic characteristic or galvanic characteristic of the connector is a copper layer, copper alloy layer, brass layer, bronze layer or similar, which is applied by electroplating, chemical vapour deposition, spluttering or other electroplating and/or deposition techniques including electroless plating using chemical reactions to cover the bare exposed metal surfaces of the flange coupling or connector.

20. A connector according to claim 17 in which the layer of chromium or nickel is from about $0.1\mu$ to about in excess of $100\mu$.

* * * * *